United States Patent [19]

Williams

[11] Patent Number: 4,729,158

[45] Date of Patent: Mar. 8, 1988

[54] TOOL FOR AIDING THE ASSEMBLY OF DRILL STABILIZER TO THE DRILL COLLAR WHEN UP THE BOTTOM HOLE ASSEMBLY

[76] Inventor: Donald L. Williams, 202 Holstein La., Youngsville, La. 70592

[21] Appl. No.: 859,394

[22] Filed: May 5, 1986

[51] Int. Cl.$^4$ .............................................. B23Q 3/00
[52] U.S. Cl. ...................................... 29/467; 29/240; 175/320
[58] Field of Search ................. 29/467, 240, 464, 469, 29/237, 241, 281.5; 175/320, 321; 285/24, 27, 39; 403/13, 14

[56] References Cited

U.S. PATENT DOCUMENTS

| | | | |
|---|---|---|---|
| 3,039,181 | 6/1962 | Sawdey | 29/237 |
| 3,885,295 | 5/1975 | Engelberger et al. | 29/281.5 |
| 4,179,783 | 12/1979 | Inoyama et al. | 29/281.5 |
| 4,265,008 | 5/1981 | Lippacher et al. | 29/240 |
| 4,538,333 | 9/1985 | Cettl | 29/240 |
| 4,553,301 | 11/1985 | Hattori | 29/240 |

Primary Examiner—Howard N. Goldberg
Assistant Examiner—Irene Golabi
Attorney, Agent, or Firm—Keaty & Keaty

[57] ABSTRACT

An apparatus and method for interconnecting a drill collar and a stabilizer in axial alignment is disclosed. The tool includes an upper plate and a lower plate held in spaced, parallel relationship to one another with the upper plate having a plurality of peripheral holes around it. A plurality of rods project between the upper and lower plates, each one of the rods being mounted at a bottom end to the lower plate and inserted adjacent its top end in sliding relationship through one of the peripheral holes in the upper plate. A spring is placed around each of the rods for biasing the top plate away from the lower plate, and an attachment pin projects downwardly from the lower plate for insertion into a kelly pin hole on an oil rig. A stabilizing pin projects upwardly from the upper plate, and a rotatable plate is rotatably secured to that stabilizing pin intermediate the ends of the stabilizing pin. A heavy stabilizer having an internally threaded end can then be placed on the rotatable plate, and a drill collar with an externally threaded end can be brought into axial alignment with the threaded end of the stabilizer. While the stabilizing pin holds the stabilizer in an upright position, the rotatable plate is rotated to threadably engage the drill collar and stabilizer. The rotatable plate is spring biased and therefore yields in response to heavy loads imposed upon it, thereby allowing the stabilizer and drill collar to be threadably interconnected without damaging the threads.

3 Claims, 3 Drawing Figures

TOOL FOR AIDING THE ASSEMBLY OF DRILL STABILIZER TO THE DRILL COLLAR WHEN UP THE BOTTOM HOLE ASSEMBLY

BACKGROUND OF THE INVENTION

1. Field of the Invention

This invention concerns an alignment tool for interconnecting cooperatively threaded members in axially aligned engagement. More particularly, this invention concerns an alignment tool for threadably interconnecting a drill collar and a stabilizer in axial alignment without damaging the threads of either.

2. General Discussion of the Background

The bottom hole assembly of a rotary oil well is usually comprised of a drill bit suspended at the bottom of a plurality of drill collars. The drill collars are often 30 foot long pipes having, for example, an 8 inch outer diameter in a 12¼ inch diameter hole. The drill collars are extremely heavy, and provide the downward force which must be applied to the drill bit in order for drilling to occur properly. The drill collars are joined in threaded, end to end engagement. Stabilizers are often located between sections of the drill collar, and these stabilizers help space the drill collar from the surrounding walls of the hole or casing.

In conventional applications, 10 to 15 heavy drill collars are used above the drill bit. A drill string typically having about a 4½ inch outer diameter in a 12¼ inch diameter hole, is connected above the collar, the drill string communicating with the rotary mechanisms at the surface so that rotation of the drill string will rotate the collars and drill bit for drilling to occur.

Each section of drill collar is a heavy tubular member having an internally threaded "box end" and an externally threaded, reduced diameter "pin end". A stabilizer section is also a heavy tubular member having an internally threaded "box end" and an externally threaded, reduced diameter "pin end". Each stabilizer is provided with elongated blades which project radially outwardly from the stabilizer to enlarge the stabilizer's outer diameter to approximately the diameter of the hole being drilled.

In order to assemble the stabilizer and drill collar, it is necessary to connect a pin end of a drill collar section to a box end of a stabilizer section. This is an exceedingly difficult chore since the stabilizers and drill collars have been made very heavy (200-300 pounds per foot) in order to provide the downward force required by the rotary drill bit. The heavy weight of these members makes it difficult to threadably engage them since their weight causes binding between their threads.

Several prior mechanisms have been proposed for axially aligning tubular members such as pipes. For example, U.S. Pat. Nos. 4,432,648 and 4,492,134 disclosed pipe alignment tools in which hydraulic rams hold adjacent pipe ends in spaced engagement during alignment, then permit controlled movement of the ends towards each other so that rotational engagement may be achieved without binding. These tools suffer from the drawback, however, of requiring sources of hydraulic pressure for operation, and are also unsuitable for the very heavy weight of the drill collar and stabilizing members.

U.S. Pat. No. 4,403,666 discloses a transfer arm which clamps tubular members with a clamp. The clamp is permitted to move under the force of axial loads applied under tubular handling operations, which movement reduces wear and damage to the threaded end of a clamped down hole tubular. Such an apparatus is once again unsuitable for interconnecting the very heavy drill collar and stabilizer.

U.S. Pat. No. 1,481,652 describes a pipe rotating attachment which rotates drill pipe for the purpose of making and breaking drill pipe joints. Rotation is achieved by attaching a clamp to a lower pipe portion, then interconnecting the clamp to a rotary table with a stake. Rotation of the table turns the lower pipe section to engage and disengage threads. Such a device fails to appreciate or overcome the damage caused when heavy, cooperatively threaded members bind each other's threads.

It is accordingly an object of this invention to provide a tool for aligning and interconnecting first and second cooperatively threaded members, such as a drill collar and a stabilizer, without binding or damaging the threads of the members.

It is yet another object of the invention to provide such a tool which will reliably function even when the cooperatively threaded members are very heavy.

Yet another object of the invention is to provide such a tool that will hold the very heavy members in a vertically upright position without permitting them to topple.

Finally, it is an object of this invention to provide such a tool that allows both axial alignment without binding and manual rotation of one of the members in a single tool.

SUMMARY OF THE INVENTION

The foregoing objects are achieved by providing an alignment tool for interconnecting first and second cooperatively threaded members in axial alignment. The tool comprises a rotatable plate with biasing means for biasing the rotatable plate in a first direction. Attachment means are provided for attaching the tool to a work surface, such as a platform of an oil rig. Stabilizing means, in the nature of a stabilizing pin projecting upwardly from the rotatable plate, allows a tubular member such as a stabilizer to be placed on the rotatable plate and held in a vertically upright position without toppling.

In especially preferred embodiments, the biasing means is comprised of an upper plate and a lower plate held in spaced, parallel relationship by a plurality of compressible, peripheral springs. The rotatable plate is mounted in weight transferring relationship to the upper plate such that application of weight to the upper plate moves that upper plate towards the lower plate against the bias of the springs.

In especially preferred embodiments, the attachment means comprises an attachment pin extending from the lower plate for insertion into a kelly drive bushing pin hole on the rotary table. In this manner, the tool can be placed closely adjacent a drill hole and be readily used for making and breaking connections between drill collars and stabilizers.

DETAILED DESCRIPTION OF PREFERRED EMBODIMENT

Figure 3:
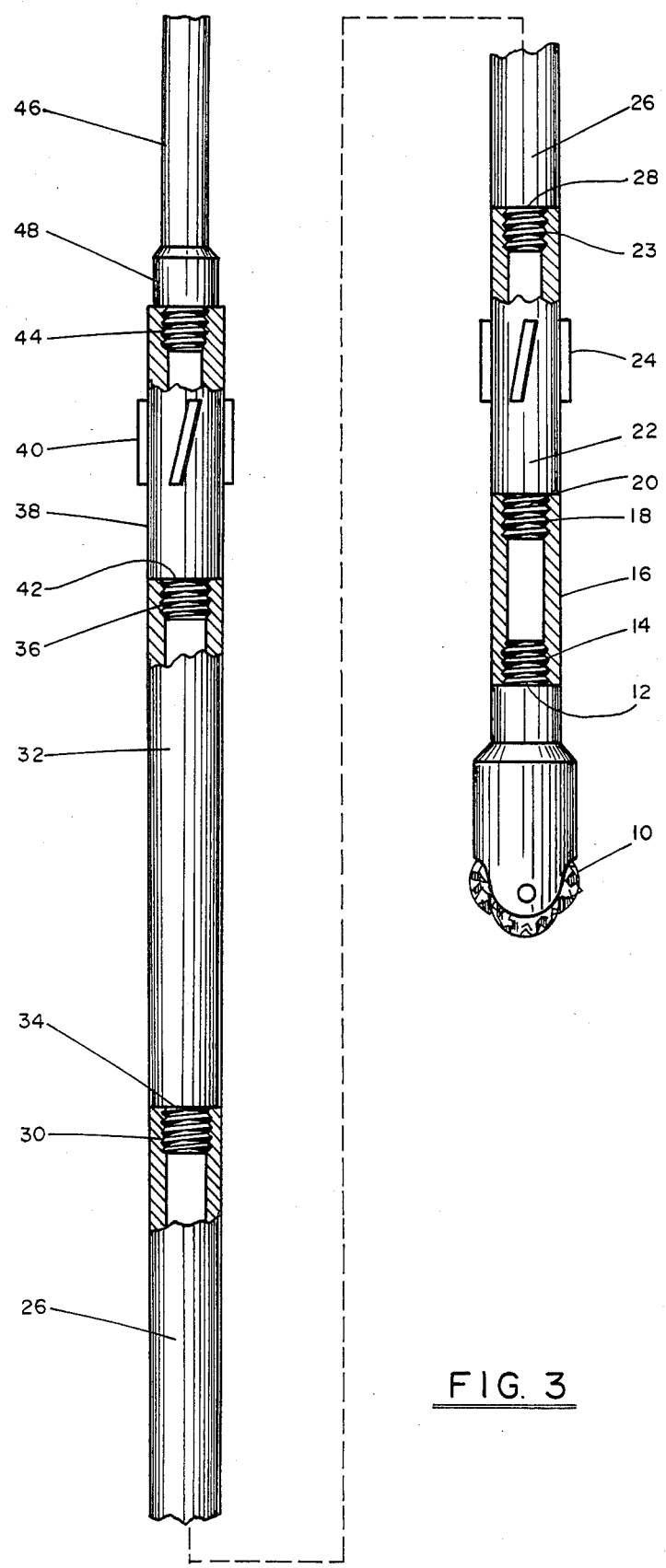
FIG. 3 is a schematic view of a rotary drill bit having a plurality of drill collars and stabilizers in place above it.

A better understanding of the invention can be had by reference to FIG. 3 in which a 12¼ inch outer diameter drill bit 10 is shown for rotary boring of a drill hole. Drill bit 10 has an externally threaded pin end 12 which engages with an internally threaded, first box end 14 of a bit sub 16. The opposite end of bit sub 16 is another, internally threaded box end 18 which engages a pin end 20 of an 8 inch outer diameter stabilizer member 22 having a plurality of blades 24 that serve to center the stabilizer member 22 within the hole being drilled. The blades 24 enlarge the outer diameter of stabilizing member 22 to about 12¼ inches, substantially the same diameter as the diameter of hole being drilled by drill bit 10. At the top of stabilizing member 22 is an internally threaded box end 23.

Located above stabilizing member 22 is a cylindrical, 30 foot long, 8 inch outer diameter drill collar 26 having an externally threaded pin end 28 and an internally threaded box end 30. The threads of ends 23, 28 are cooperatively threaded for interengagement upon rotation of drill collar 26 relative to stabilizing member 22.

Located above drill collar 26 is another drill collar 32 having an externally threaded pin end 34 which is reduced in diameter relative to the remainder of drill collar 34, and an internally threaded box end 36. The threads at ends 30, 34 are cooperatively threaded and of a substantially similar slope such that rotation of one member relative to the other will interengage the threads.

Another stabilizing member 38 is located above drill collar 32. Stabilizing member 38 is provided with blades 40, externally threaded pin end 42 and internally threaded box end 44. A drill pipe 46 is axially aligned above stabilizing member 38 and has an externally threaded pin end 48 which is cooperatively threaded with the threads of box end 44 of stabilizing member 38. Drill pipe 46 extends to the surface, and receives the rotary forces which turn the drill collars 26, 32 and stabilizing members 22, 38. The drill pipe typically has a 4½ or 5 inch outer diameter in a 12¼ inch diameter hole. Each section of drill pipe is 30 feet long with a pin connection on the bottom and a box connection on the top. The drill pipe is assembled by simply screwing together the pin threads and box threads and tightening the sections with tongs to keep them from coming apart in the hole.

In a typical rotary well, the drill pipe may be 15,000 feet long with the bottom hole assembly located at the bottom. In a hole that is 10,000 deep, one typically has 10 drill collars and 6 stabilizers in the hole.

Figures 1, 2:
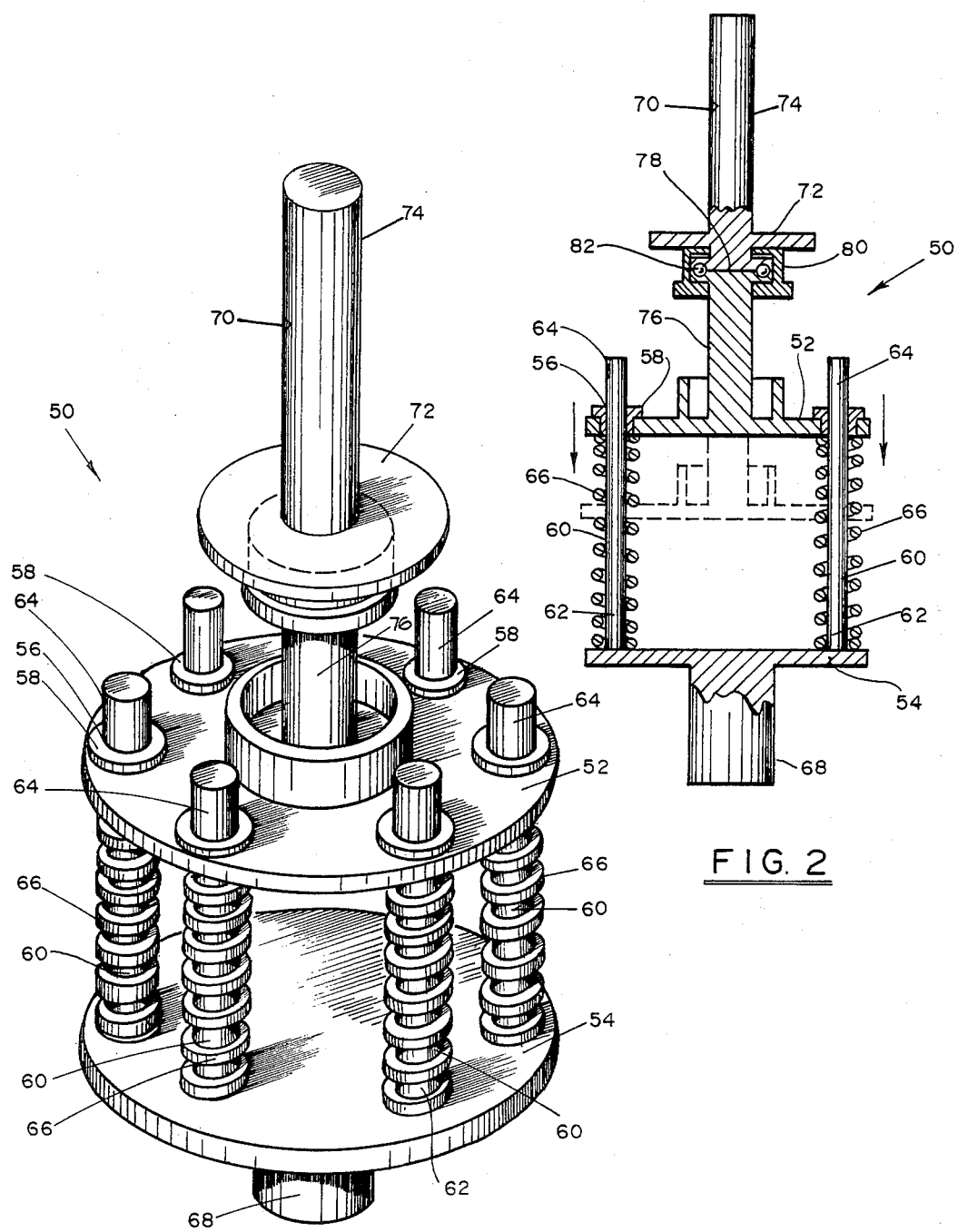
FIG. 1 is a perspective view of a preferred embodiment of the alignment tool, portions of a bearing structure being shown in phantom.
FIG. 2 is a reduced, side elevational view of the alignment tool shown in FIG. 1, a depressed position of the upper plate being shown in phantom.

The threaded interconnection of drill pipe sections is much easier than the threaded interconnection of stabilizers and drill collars because of the smaller size and lighter weight of the drill pipe sections. The present invention instead particularly concerns an alignment tool for interconnecting a drill collar, such as drill collars 26 or 32, with a stabilizing member such as 22 or 38 respectively. As seen in FIGS. 1 and 2, the alignment tool 10 comprises an upper circular plate 52 and a lower circular plate 54 held in spaced, parallel relationship to one another, the upper plate having a plurality of peripheral holes 56 therearound. Each of holes 56 has a sleeve 58 therethrough for providing a reinforced opening having a smooth, cylindrical wall. In preferred embodiments, each plate has an outer diameter of about 12 inches.

A plurality of steel rods 60 project between upper and lower circular plates 52, 54, each of rods 60 being mounted at a bottom end 62 in fixed, welded relationship to lower plate 54 and inserted adjacent a top end 64 in sliding relationship through one of holes 56.

A helical coil spring 66 is provided around each of rods 60 for biasing said upper plate 52 away from lower plate 54. The chosen springs have sufficient strength to maintain plates 52, 54 in spaced relationship if a stabilizer member 22 is placed on it, yet will partially yield under the additional weight of a drill collar being brought into axial alignment with stabilizer member 22.

An attachment pin 68 projects downwardly from lower plate 54. Pin 68 is in the nature of a cylindrical, solid element axially aligned with lower plate 54 and integrally formed with or welded to plate 54. The outer diameter of pin 68 is substantially less than that of plate 54, for example preferably 3¼ inches. The length of pin 68 is four inches.

A stabilizing pin 70 is a solid member projecting upwardly from upper plate 52. The outer diameter of stabilizing pin 70 is much less than the diameter of circular upper plate 52, for example 2 inches, and its length is about 8 inches. A rotatable plate 72 is rotatably secured around stabilizing pin 70 intermediate its free upper end and its lower end which is secured to upper plate 52. The diameter of rotatable plate 72 is, in the preferred embodiment, small enough that plate 72 is contained completely within an area bounded by rods 60. Plate 72 is also parallel to plates 52, 54.

Stabilizing pin 70 is comprised of an upper section 74 and lower section 76. Lower section 76 is fixed solidly to upper plate 52, while upper section 74 is a separate member which is separated at 78 so that upper section 74 can rotate freely relatively to lower section 76. Ball bearings 80 within a ball bearing assembly 82 permit free rotation of upper section 74 and rotatable plate 72 which is attached thereto.

As is known in the art, a rotary drill pipe is turned with a kelly. The kelly is provided with rollers which engage the drill pipe and turn it. Adjacent the bottom of the rollers are four pins, and when these pins reach the rotary table they fit into four receiving holes in the kelly drive bushing on the rotary table. Once the pins fit into the receiving holes, the kelly begins to turn the drill pipe.

These four receiving holes are not in use when the bottom hole assembly is being assembled. For that reason, pin 68 of tool 50 can be inserted into a receiving hole and firmly held in position while in use.

In operation, tool 50 is attached to the rotary table adjacent the drill hole by placing pin 68 in one of the receiving holes. A first tubular member, such as a stabilizing member 22, is placed on top of rotatable plate 72 by a traveling block. The inside diameter of pin end 20 of stabilizing member 22 is less than the outside diameter of rotatable plate 72 so that rotatable plate 72 will support stabilizing member 22 in a vertically upright position with pin end 20 resting on plate 72 and box end 23 pointed upwardly. Stabilizing pin 70 projects upwardly into the hollow interior of stabilizing member 22 to prevent it from tipping over. In this manner, stabilizing member 22 is held in a stable, vertically upright position with an externally threaded pin end resting on rotatable plate 72 and an internally threaded box end 23 at its free, top most end. A conventional traveling block can then bring a vertically oriented drill collar 26 into end to end alignment with stabilizing member 22 with the external threads of pin end 28 of drill collar 26 in engaging relationship with the internal threads of box end 23 of stabilizing member 22. The traveling block can allow pin end 28 of drill collar 26 to press down against box end 23 of stabilizing member 22, then rotary force can be applied to stabilizing member 22. Stabilizing member 22 is free to move in response to this rotary force since rotatable plate 72 can rotate on ball bearings 80.

As the weight of drill collar 26 is applied to stabilizing assembly 22, upper plate 52 moves against the bias of springs 66 to prevent the threads of ends 23, 28 from binding and damaging each other. In this manner, stabilizers and drill collars can be engaged with one another without causing expensive and time consuming damage to either of them.

It should be apparent that the same procedure can be repeated to threadably engage other stabilizing members and drill collars, or likewise to threadably engage drill collars (such as drill collars 26, 32) to one another.

It now will be recognized that a new and improved alignment tool has been provided that is positive and reliable in operation, and structurally quite rugged. Since certain changes or modifications may be made in the disclosed embodiment by those skilled in the art without departing from the inventive concepts involved, it is the aim of the appended claims to cover all such changes and modifications falling within the true spirit and scope of the present invention.

I claim:

1. An alignment tool for interconnecting a drill collar and a stabilizer in axial alignment, said tool comprising:

an upper plate and a lower plate held in spaced, parallel relationship to one another, said upper plate having a plurality of peripheral holes therearound;

a plurality of rods projecting between said upper and lower plates, each of said rods being mounted at a bottom end in fixed relationship to said lower plate and inserted adjacent a top end in sliding relationship through one of said peripheral holes;

a spring around each of said rods for biasing said upper plate away from said lower plate;

an attachment pin projecting downwardly from said lower plate;

a stabilizing pin projecting upwardly from said upper plate; and a rotatable plate rotatably secured to said stabilizing pin intermediate the ends of said stabilizing pin.

2. A method of aligning and interconnecting a stabilizer and drill collar in axial alignment, said stabilizer and drill collar having cooperatively threaded ends, said method comprising:

providing a tool comprised of a rotatable plate which is spring biased towards a first direction and has a stabilizing member projecting upwardly from said rotatable plate;

attaching said tool to a surface adjacent a drill hole;

stabilizing said stabilizer on said rotatable plate with said stabilizing member;

bringing said cooperatively threaded ends of said drill collar and stabilizer into adjacent relationship with one another with the weight of said drill collar moving said rotatable plate against said spring bias; and rotating said rotatable plate to engage said cooperative threads of said stabilizer and drill collar.

3. The method of claim 2 wherein said tool is provided with an attachment pin, and said surface is provided with a receiving hole into which a kelly pin is placed, wherein the step of attaching said tool to said surface comprises placing said attachment pin into said receiving hole.

* * * * *